(12) United States Patent
Turner et al.

(10) Patent No.: US 7,594,688 B1
(45) Date of Patent: Sep. 29, 2009

(54) CLIP DEVICE FOR BALANCING OPPOSING VARIATION IN A TRIPARTITE TRIM STACKUP

(75) Inventors: Phillip M. Turner, Montrose, MI (US); Russell J. Peyerk, Romeo, MI (US); Michael J. Ewin, Oak Park (AU)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/145,651

(22) Filed: Jun. 25, 2008

(51) Int. Cl.
*B60J 7/08* (2006.01)

(52) U.S. Cl. .................................. 296/107.01

(58) Field of Classification Search ............ 296/107.09, 296/116, 117, 121, 107.01

See application file for complete search history.

(56) References Cited

U.S. PATENT DOCUMENTS

2003/0098593 A1\* 5/2003 Holst et al. ............ 296/107.08

\* cited by examiner

*Primary Examiner*—Joseph D Pape
(74) *Attorney, Agent, or Firm*—Quinn Law Group, PLLC.

(57) ABSTRACT

A clip device is provided for balancing opposing variation in a tripartite trim stackup. The tripartite stackup includes a first trim member adjacent to a second trim member, and a trim component positioned at a center thereof. The clip device includes a base portion with a locating pin projecting therefrom, which operates to link the trim component to the clip device. A projection extends from the base portion, and mates with the first trim member to provide a pivot for the clip device. First and second protuberances project from the base portion. The first protuberance mates with and links the first trim member to the clip device. The second protuberance mates with and links the second trim member to the clip device. The clip device converts positional variation of the first and second trim members into rotational float, thereby repositioning the trim component at the center of the trim members.

20 Claims, 3 Drawing Sheets

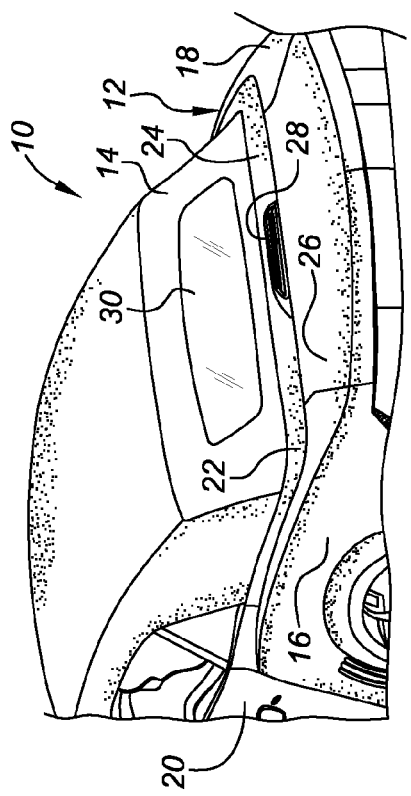
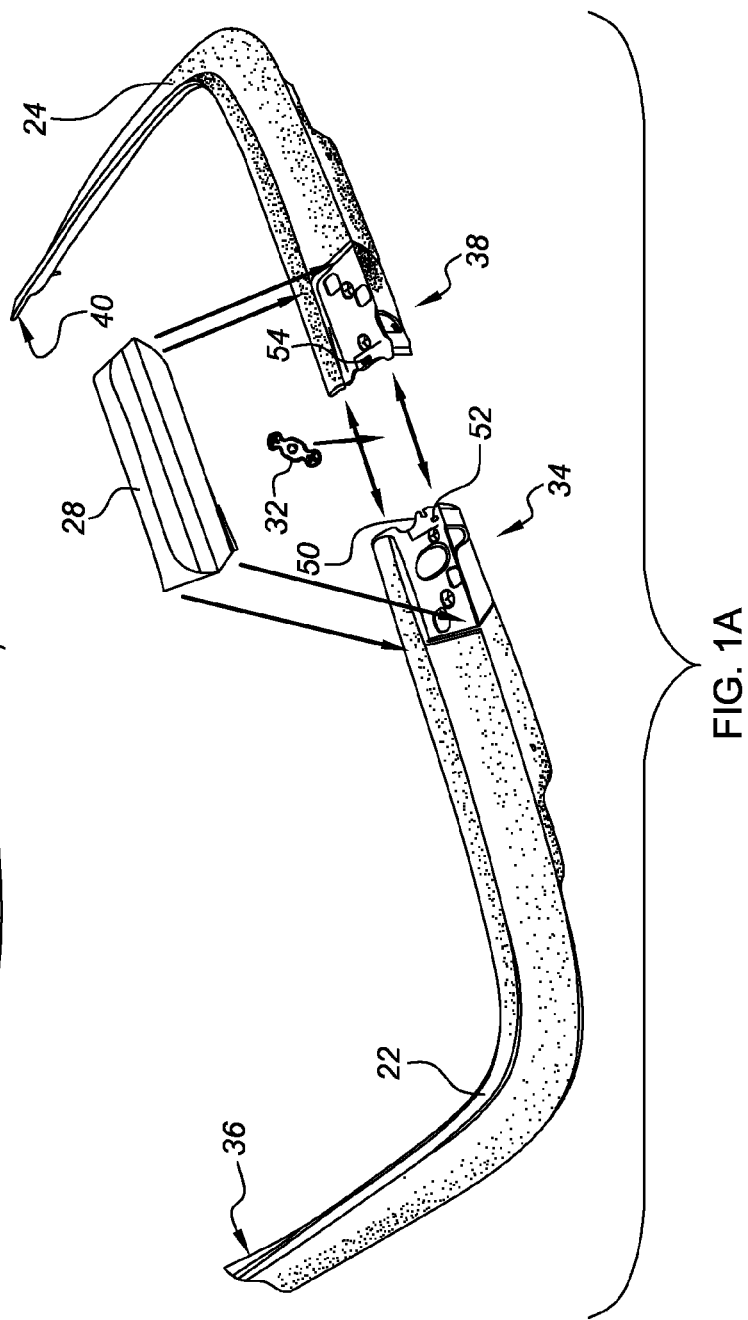

CLIP DEVICE FOR BALANCING OPPOSING VARIATION IN A TRIPARTITE TRIM STACKUP

TECHNICAL FIELD

The present invention relates generally to fastening arrangements, and more specifically to clip devices for locating and attaching components during the assembly of a motorized vehicle.

BACKGROUND OF THE INVENTION

Most contemporary motor vehicles utilize numerous cover and trim panels to provide aesthetically appealing interior and exterior surfaces. Various fastening arrangements have heretofore been employed for securing cover and trim panels at various locations along the motor vehicle. Such panels are typically mounted to the vehicle substructure (e.g., metal frame or inner paneling), for example, through the use of locator pins and clips. The locator pins operate to properly position the cover panel along the vehicle frame, and the clips hold it in place.

Often times, the individual panels are fastened or attached to each other in addition to, or in lieu of, connecting directly to the vehicle substructure. Moreover, there are various vehicle components (also referred to as "general assembly trim components") that are wholly supported by attachment to two or more panels, creating what may be referred to as a tripartite trim stackup. Not all general assembly trim components can be located by their fastener features alone. For example, a component may require precision locating due to its particular function or appearance. The use of prior art attachment fixtures may be undesirable because of ergonomics and mutilation issues, and may increase the cost of design and manufacture.

In the manufacture and assembly of the vehicle, some positional variation between the constituent parts is, to some extent, intrinsic. Such positional variation can be the result of such factors as individual component manufacturing tolerances, attachment features on the vehicle body for each individual component, fastener torque influences, thermal expansion or contraction, etc. An optimal attachment strategy will push variation stack-ups away from critical interfaces, preventing variation from impacting function or appearance. However, it is not always possible to isolate or eliminate positional variation when assembling trim components into the vehicle as a system, and, as a result, the variations can remain visible to the end customer.

SUMMARY OF THE INVENTION

The present invention provides a simple clip device that will balance the opposing variation between two primary components in a tripartite trim stackup, and provide a locating feature for a third component that must be positioned to the center point of variation of the two primary trim components. Specifically, the position of the two primary components may vary individually (i.e., cross-car positional variation) as well as relative to each other (i.e., relationship variation) in random amounts. The present invention is engineered to utilize rotational float of the fixed length clip device (or link), which is positioned between the two primary trim components, to balance any positional variation in the trim stackup. This constant centering flotation allows the clip device to present a feature of control for the third trim component that, by design requirements, must be positioned at the center of variation of the two primary components.

According to one embodiment of the present invention, a clip device for balancing opposing variation in a tripartite trim stackup is provided. The tripartite stackup includes first and second trim members that are oriented such that one end of the first trim member is adjacent to a complimentary end of the second trim member. A third trim member is positioned at the center of and attached to the first and second trim members. The first trim member defines a receiving slot and a first cavity at the first end thereof. Similarly, the second trim member defines a second cavity at the second end thereof.

The clip device includes a base portion with first and second opposing surfaces. A locating pin projects from the first surface, and operates to mate with and thereby link the third trim member to the clip device. A projection extends from the second surface of the base portion, and operates to mate with the receiving slot to provide a pivot for the clip device. First and second protuberances project from the second surface. The first protuberance is configured to mate with the first cavity to link the clip device to the first trim member. The second protuberance is configured to mate with the second cavity to link the clip device to the second trim member. The projection cooperates with the first and second protuberances to convert positional variation of the first and second trim members into rotational float of the clip device, and thereby reposition the third trim member to the center of the first and second trim members.

According to one aspect of this embodiment, the first and second protuberances are respectively configured to transition within the first and second cavities in response to positional variation of the first and second trim members. Ideally, the first protuberance transitions along a first path that is substantially orthogonal to a path of variation of the first and second trim members, whereas the second protuberance transitions along a second path that is also substantially orthogonal to the path of variation. In this instance, it is preferred that the first and second protuberances extend substantially orthogonally from the second surface, at opposing ends of the base portion. Moreover, the first and second protuberances are preferably oriented substantially equidistant from a center of the base portion. Finally, the first and second protuberances are at least partially cylindrical.

In accordance with another aspect of this embodiment, the projection is configured to transition along a third path within the receiving slot in response to positional variation of the first and second trim members. The third path is substantially parallel to the path of variation of the first and second trim members. It is desired that the projection includes a stem portion that is attached to the base portion at a proximate end thereof, and a flange portion extending from a distal end of the stem portion. In addition, the projection preferably extends generally orthogonally from the second surface, oriented substantially equidistant to the first and second protuberances.

According to yet another aspect, the locating pin extends from the first surface of the base portion in opposing relationship to, and substantially coaxial with the projection. Additionally, the locating pin is preferably oriented substantially equidistant to the first and second protuberances.

In accordance with another embodiment of the present invention, a tripartite trim stackup is provided for a motorized vehicle. The trim stackup includes first, second and third trim members, and a clip device for balancing opposing variation. The first trim member has a first end that defines a laterally elongated receiving slot adjacent to a longitudinally elongated first cavity. The second trim member has a second end that defines a longitudinally elongated second cavity. The first and second trim members are attached to the vehicle and oriented such that the first end is adjacent to the second end.

The third trim member is operatively attached to, and positioned at the center of the first and second trim members.

The clip device includes a base portion having first and second opposing surfaces. A locating pin projects from the first surface to mate with and thereby link the third trim member to the clip device. A projection extends from the second surface of the base portion, and rotatably mates with the receiving slot to provide a pivot for the clip device. First and second protuberances project from the second surface of the base portion. The first protuberance mates with the first cavity to link the clip device to the first trim member. In a similar regard, the second protuberance mates with the second cavity to link the clip device to the second trim member. The first and second protuberances are respectively configured to transition longitudinally within the first and second cavities and the projection is configured to transition laterally along the receiving slot in response to lateral variation of the first and second trim members to thereby reposition the third trim member at the center of the first and second trim members.

According to one aspect of this embodiment, the first protuberance, in response to positional variation of the first and second trim members, transitions along a first path that is substantially orthogonal to a path of variation of the first and second trim members. Furthermore, the second protuberance transitions along a second path that is opposite to the first path and substantially orthogonal to the path of variation. Ideally, the projection is configured to transition along a third path that is substantially orthogonal to the first and second paths, and substantially parallel to the path of variation of the first and second trim members.

According to another aspect, the first and second protuberances extend substantially orthogonally from the second surface at opposing ends of the base portion, substantially equidistant from a center thereof. In a similar regard, the projection preferably extends generally orthogonally from the second surface, oriented substantially equidistant to the first and second protuberances. It is also desired that the locating pin extend substantially orthogonally from the first surface of the clip device in opposing relationship to and substantially coaxial with the projection. Finally, the projection preferably includes a stem portion attached to the base portion at a proximate end thereof, and a flange portion extending from a distal end of the stem portion.

In another embodiment of the present invention, a motorized vehicle is provided, including a first trim member with a first end that defines a laterally elongated receiving slot inboard from a longitudinally elongated first cavity, and a second trim member with a second end that defines a longitudinally elongated second cavity. The trim members are attached to the vehicle substructure, and oriented such that the second end is adjacent to the first end. A trim component is attached to the first and second trim members, and positioned at a center thereof.

The vehicle also includes a clip device having a base portion with first and second opposing surfaces. A locating pin projects from the first surface to mate with and thereby link the trim component to the clip device. A projection extends from the second surface of the base portion to rotatably mate with the receiving slot and provide a pivot for the clip device. First and second protuberances project from the second surface on opposing sides of the projection. The first protuberance mates with the first cavity to link the clip device to the first trim member. The second protuberance mates with the second cavity to link the clip device to the second trim member. The first and second protuberances are respectively configured to transition longitudinally within the first and second cavities and the projection is configured to transition laterally along the receiving slot in response to lateral variation of the first and second trim members to thereby reposition the trim component at the true center of the first and second trim members.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 1 is a perspective-view illustration of the rear portion of an exemplary motorized vehicle for integration and use of the present invention;

FIG. 1A is an exploded perspective-view illustration of the left- and right-hand tulip panels, CHMSL light, and clip device of FIG. 1;

DESCRIPTION OF THE PREFERRED EMBODIMENTS

Figure 2:
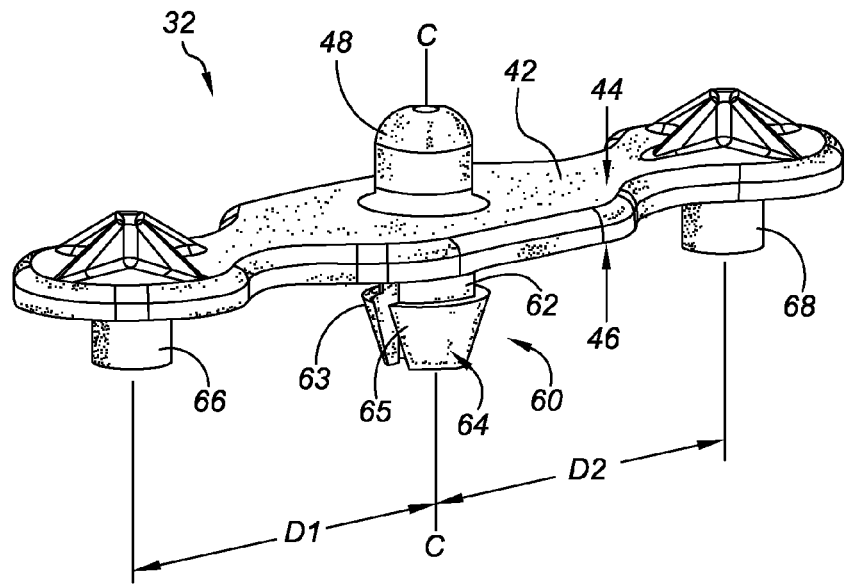
FIG. 2 is a perspective-view illustration of a clip device for balancing opposing variation in a tripartite trim stackup in accordance with a preferred embodiment of the present invention.

Referring to the drawings, wherein like reference numbers refer to like components throughout the several views, FIG. 1 is a perspective-view illustration of the rear portion of a representative motorized vehicle, identified generally as 10, with which the present invention may be incorporated and practiced. It should be readily understood that FIG. 1 is merely an exemplary application by which the present invention may be practiced. As such, the present invention is by no means limited to the vehicle configuration of FIG. 1. For example, although the vehicle 10 is depicted in FIG. 1 as a standard passenger car, the present invention can be incorporated into any motorized vehicle, such as, but not limited to, sport utility vehicles, light trucks, heavy duty vehicles, minivans, buses, boats, airplanes, etc. Finally, the drawings presented herein are not to scale, and are provided purely for instructional purposes. Thus, the specific and relative dimensions shown in the drawings are not to be considered limiting.

Referring first to FIG. 1 of the drawings, the vehicle 10 has a body or vehicle structure, designated generally at 12, which includes roof structure 14, left- and right-hand rear quarter panels 16 and 18, respectively, and two door assemblies (one of which is visible in FIG. 1 and identified by reference numeral 20). It should be noted that the vehicle roof structure 14 is illustrated as a convertible rooftop assembly; however, the present invention is not so limited. A left-hand tulip panel 22 (also referred to herein as "first trim member") is positioned laterally adjacent a right-hand tulip panel 24 (also referred to herein as "second trim member"). The left- and right-hand tulip panels 22, 24 are mounted to respective sections of the vehicle structure 12, intermediate a deck or trunk lid 26 and the vehicle roof structure 14. The tulip panels 22, 24 cooperate to provide an aesthetically appealing transition surface between the roof structure 14 and the deck lid 26, left-hand rear quarter panel 16, and right-hand rear quarter panel 18. As will be described in extensive detail hereinbelow, a courtesy high-mount stop light (CHMSL) assembly 28, which is also referred to herein as "third trim member" or "trim component", is mounted on the rear of vehicle 10 in a central location of the vehicle structure 12, preferably below a rear window 30.

FIG. 1A is an exploded view of the left- and right-hand tulip panels 22, 24 and CHMSL light 28 of FIG. 1 with a clip device 32 in accordance with a preferred embodiment of the present invention. The clip device 32 is engineered to balance opposing variation between two primary components in a tripartite trim stackup, which is represented herein by, but not explicitly limited to, the tulip panels 22, 24, and CHMSL light 28. The position of the left- and right-hand tulip panels 22, 24 may vary individually (known in the art as "cross-car positional variation"), which can result, for example, from build-to-build variations and individual component manufacturing tolerances. The position of the tulip panels 22, 24 may also vary relative to each other in random amounts (which is known in the art as "relationship variation"), which may be due to attachment features on the vehicle body for the individual component, fastener torque influences, thermal expansion or contraction, etc. Any opposing variation in the tripartite trim stackup that is visibly perceptible to an end-user is undesirable.

The left-hand tulip panel 22 has an inboard portion (also referred to herein as "first end"), indicated generally at 34 in FIG. 1A, that is proximate to the deck lid 26 of FIG. 1 and in opposing relation to an outboard portion (or "third end") 36. Similarly, the right-hand tulip panel 24 has an inboard portion (also referred to herein as "second end"), which is indicated generally at 38, that is also proximate to the deck lid 26, and in opposing relation to an outboard portion (or "fourth end") 40. As seen throughout the several views, the primary trim members—i.e., tulip panels 22, 24, are mounted to the vehicle structure 12 and oriented such that the first end 34 of the left-hand tulip panel 22 is adjacent to the second end 38 of the right-hand tulip panel 24.

Figure 4:
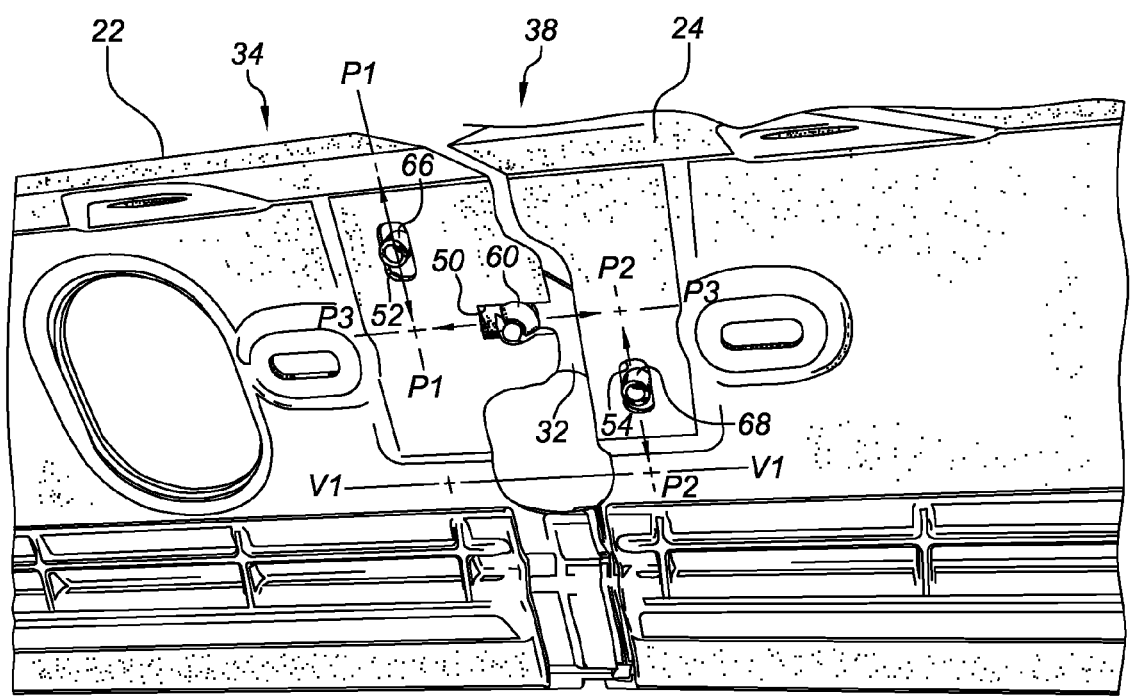
FIG. 4 is an underside perspective view of the left- and right-hand tulip panels and clip device of FIG. 3.

With reference to both FIGS. 1A and 4, the first end 34 of the left-hand tulip panel 22 defines a laterally elongated receiving slot 50. In accordance with preferred practice, the receiving slot 50 has a generally horizontal, fork-shaped profile, and is positioned inboard from a longitudinally elongated (first) cavity or channel 52. The second end 38 of the right-hand tulip panel 24 also defines a longitudinally elongated (second) cavity or channel 54. The first and second cavities 52, 54 are preferably oblong in shape, oriented parallel to one another, and diagonally offset relative to the receiving slot 50. It should be noted that the receiving slot 50 could be formed through the second end 38 of the right-hand tulip panel 24 without departing from the intended scope of the present invention. It is also within the scope and spirit of the present invention that the relative positioning of the first and second cavities 52, 54 along their respective ends 34, 38 be switched.

The clip device 32 is shown in FIG. 2 with a generally flat, fixed-length base portion 42 having first and second opposing surfaces 44 and 46, respectively. A locating pin 48 projects outward from the first surface 44 of the base portion 42. The locating pin 48, which is a generally cylindrical segment with a rounded end, extends generally orthogonally from the base portion 42. The locating pin 48 is configured (i.e., dimensioned and positioned) to mate with and thereby link the clip device 32 to the third trim member—i.e., CHMSL assembly 28. According to the representative application portrayed herein, the CHMSL assembly 28 includes a complementary slot in a backside thereof that receives the locating pin 48, and thereby mechanically links the CHMSL assembly 28 to the clip device 32. The locating pin 48 also functions as a locating feature to ensure that the CHMSL assembly 28, when assembled to the vehicle 10, is positioned at the center point of variation of the left- and right-hand tulip panels 22, 24.

A projection, indicated generally at 60 in FIG. 2, extends in a preferably orthogonal manner from the second surface 46 of the base portion 42. The projection 60 preferably includes a generally cylindrical stem portion 62 attached to the base portion 42 at a proximate end thereof, and a flange portion 64 extending from a distal end of the stem portion 62. In accordance with the preferred embodiment of FIG. 2, the locating pin 48 extends from the first surface 44 of the base portion 42 in opposing relationship to, and substantially coaxial with the projection 60. The projection 60 is configured to rotatably mate with the receiving slot 50 to provide a pivot for the clip device 32. That is, the flange portion 64, namely first and second juxtaposed frusta-conical halves 63 and 65, respectively, may be pressed into, and snap fit with the receiving slot 50. Once properly mated, the clip device 32 may then translate back-and-forth along the length of the receiving slot 50, and simultaneously pivot about projection 60—both actions collectively referred to as "rotational float" of the clip device 32.

First and second generally cylindrical protuberances 66 and 68, respectively, project outward from the second surface 46. Ideally, the protuberances 66, 68 extend substantially orthogonally from the second surface 46, at opposing ends of the base portion 42. Moreover, the first and second protuberances 66, 68 are preferably oriented substantially equidistant from a center C of the base portion 42, which is intended as the center of rotation of the clip device 32. In other words, the distance D1 between the first protuberance 66 and the center C is equal to the distance D2 between the second protuberance 68 and the center C. In addition, both the locating pin 48 and the projection 60 are preferably oriented substantially equidistant to the first and second protuberances 66, 68. The first protuberance 66 is configured (i.e., positioned and dimensioned) to mate with the first cavity 52 and thereby link the clip device 32 to the first trim member—e.g., left-hand tulip panel 22, as seen in FIG. 4. In a similar respect, the second protuberance 68 is configured to mate with the second cavity 54 and, in so doing, link the clip device 32 to the second trim member—e.g., right-hand tulip panel 24.

Figure 3:
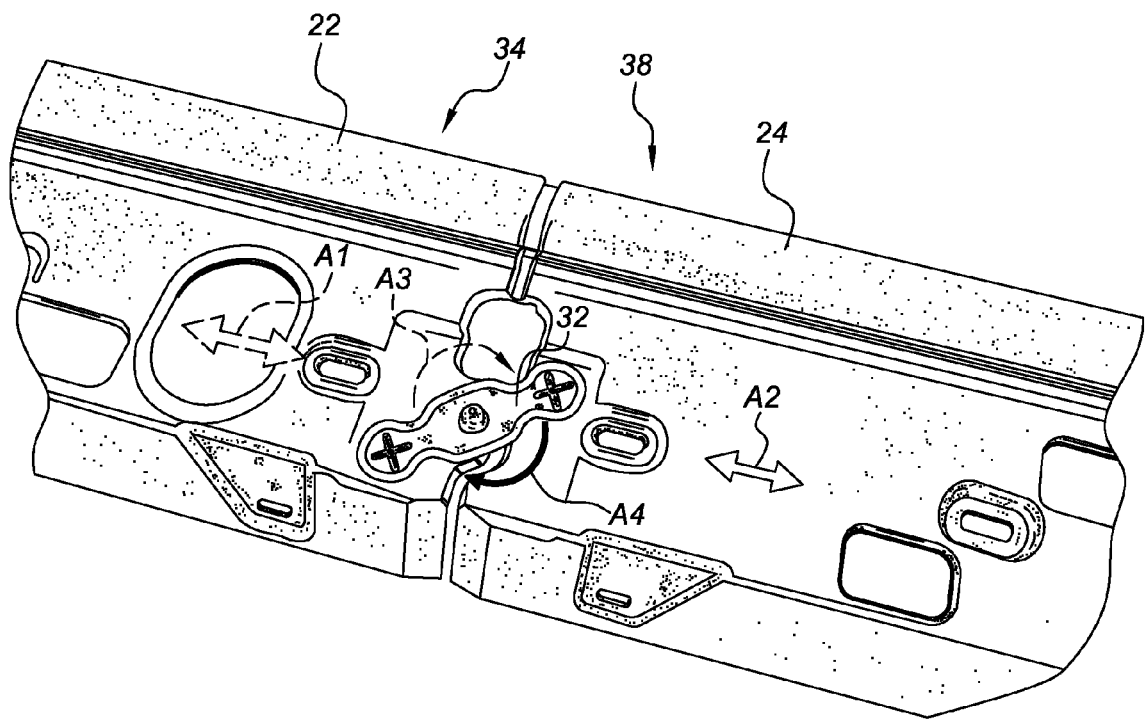
FIG. 3 is an enlarged perspective-view illustration of the clip device of FIG. 2 operatively attached to the left- and right-hand tulip panels.

The projection 60 cooperates with the first and second protuberances 66, 68 to convert positional variation of the first and second trim members 22, 24 into rotational float of the clip device 32, thereby repositioning the third trim member (e.g., CHMSL assembly 28) to the true center of the first and second trim members (e.g., left- and right-hand tulip panels 22, 24). Put another way, the present invention exploits the rotational float of the fixed length clip device 32, which is positioned between the two primary trim components, to balance any positional variation in the tripartite trim stackup. By way of example, and not limitation, when the left- and right-hand tulip panels 22, 24 vary in their linear distance from each other, the variation is transferred into rotational motion of the link 32, which stays centered between the two primary parts, regardless of the amount of individual or combined variation, by pivoting about its own center and translating laterally. The variation between the left- and right-hand tulip panels 22, 24 (respectively represented in FIG. 3 by arrows A1 and A2) will force the clip device 32 to rotate (which is represented by arrows A3 and A4), balancing the clip's centering feature—i.e., locating pin 48. Drift of the clip device 32 is controlled by receiving slot 50.

Referring again to FIG. 4, the first protuberance 66, in response to positional variation of the first and second trim members 22, 24, transitions within the first cavity 52 along a first path P1 that is substantially orthogonal to a path of variation V1 of the first and second trim members 22, 24. In a similar respect, the second protuberance 68 transitions within the second cavity 54 along a second path P2 that is parallel to the first path P1 of the first protuberance 66, and substantially orthogonal to the path of variation V1 of the trim members 22, 24. Finally, the projection 60 is configured to transition the length of the receiving slot 50 along a third path P3 that is substantially orthogonal to the first and second paths P1, P2, and substantially parallel to the path of variation V1 of the first and second trim members 22, 24.

While the best modes for carrying out the present invention have been described in detail, those familiar with the art to which this invention relates will recognize various alternative designs and embodiments for practicing the invention within the scope of the appended claims.

The invention claimed is:

1. A clip device for use with a tripartite trim stackup that includes first and second trim members oriented such that a first end of the first trim member is adjacent a second end of the second trim member, and a third trim member positioned at the center of and attached to the first and second trim members, the clip device comprising:
    a base portion having first and second opposing surfaces;
    a locating pin projecting from said first surface and configured to mate with and thereby operatively attach the third trim member to the clip device;
    a projection extending from said second surface and configured to mate with one of the first and second trim members to provide a pivot for the clip device; and
    first and second protuberances projecting from said second surface, said first protuberance configured to mate with the first trim member to operatively attach the clip device thereto, and said second protuberance configured to mate with the second trim member to operatively attach the clip device thereto;
    wherein said projection cooperates with said first and second protuberances to convert positional variation of the first and second trim members into rotational float of the clip device and thereby reposition the third trim member to the center of the first and second trim members.

2. The clip device of claim 1, wherein the first and second ends of the first and second trim members respectively define first and second cavities, and wherein said first and second protuberances are respectively configured to transition within the first and second cavities in response to positional variation of the first and second trim members.

3. The clip device of claim 2, wherein said first protuberance transitions along a first path that is substantially orthogonal to a path of variation of the first and second trim members, and said second protuberance transitions along a second path that is substantially orthogonal to said path of variation.

4. The clip device of claim 3, wherein said first and second protuberances extend substantially orthogonally from said second surface at opposing ends of said base portion.

5. The clip device of claim 4, wherein said first and second protuberances are oriented substantially equidistant from a center of said base portion.

6. The clip device of claim 5, wherein said first and second protuberances are at least partially cylindrical.

7. The clip device of claim 3, wherein the first end of the first trim member further defines a receiving slot, and wherein said projection is configured to transition along a third path within the receiving slot in response to positional variation of the first and second trim members, said third path being substantially parallel to said path of variation.

8. The clip device of claim 7, wherein said projection includes a stem portion attached to said base portion at a proximate end thereof, and a flange portion extending from a distal end of said stem portion.

9. The clip device of claim 8, wherein said projection extends generally orthogonally from said second surface.

10. The clip device of claim 9, wherein said projection is oriented substantially equidistant to said first and second protuberances.

11. The clip device of claim 1, wherein said locating pin extends from said first surface in opposing relationship to and substantially coaxial with said projection.

12. The clip device of claim 11, wherein said locating pin is oriented substantially equidistant to said first and second protuberances.

13. A tripartite trim stackup for a motorized vehicle, comprising:
    a first trim member having a first end defining an elongated receiving slot adjacent to an elongated first cavity;
    a second trim member having a second end defining an elongated second cavity, said first and second trim members being operatively attached to the vehicle and oriented such that said first end is adjacent to said second end;
    a third trim member operatively attached to said first and second trim members, and positioned at a center thereof; and
    a clip device including a base portion having first and second opposing surfaces, a locating pin projecting from said first surface to mate with and thereby link said third trim member to said clip device, a projection extending from said second surface to rotatably mate with said receiving slot to provide a pivot for said clip device, and first and second protuberances projecting from said second surface, said first protuberance mating with said first cavity to link said clip device to said first trim member, and said second protuberance mating with said second cavity to link said clip device to said second trim member;
    wherein said first and second protuberances are respectively configured to transition longitudinally within said first and second cavities and said projection is configured to transition laterally along said receiving slot in response to lateral variation of said first and second trim members thereby repositioning said third trim member at said center of said first and second trim members.

14. The tripartite trim stackup of claim 13, wherein said first protuberance transitions along a first path that is substantially orthogonal to a path of variation of said first and second trim members, and said second protuberance transitions along a second path that is parallel to said first path and substantially orthogonal to said path of variation.

15. The tripartite trim stackup of claim 14, wherein said projection is configured to transition along a third path that is substantially orthogonal to said first and second paths and substantially parallel to said path of variation.

16. The tripartite trim stackup of claim 15, wherein said first and second protuberances extend substantially orthogonally from said second surface at opposing ends of said base portion, substantially equidistant from a center thereof.

17. The tripartite trim stackup of claim 16, wherein said projection extends generally orthogonally from said second surface, oriented substantially equidistant to said first and second protuberances.

18. The tripartite trim stackup of claim 17, wherein said locating pin extends substantially orthogonally from said first surface in opposing relationship to and substantially coaxial with said projection.

19. The tripartite trim stackup of claim 18, wherein said projection includes a stem portion attached to said base portion at a proximate end thereof, and a flange portion extending from a distal end of said stem portion.

20. A motorized vehicle having a vehicle substructure, comprising:
- a first trim member having a first end defining a laterally elongated receiving slot inboard from a longitudinally elongated first cavity;
- a second trim member having a second end defining a longitudinally elongated second cavity, said first and second trim members being operatively attached to the vehicle substructure and oriented such that said first end is adjacent to said second end;
- a trim component operatively attached to said first and second trim members, and positioned at a center thereof, and
- a clip device including a base portion having first and second opposing surfaces, a locating pin projecting from said first surface to mate with and thereby link said trim component to said clip device, a projection extending from said second surface to rotatably mate with said receiving slot to provide a pivot for said clip device, and first and second protuberances projecting from said second surface on opposing sides of said projection, said first protuberance mating with said first cavity to link said clip device to said first trim member, and said second protuberance mating with said second cavity to link said clip device to said second trim member;
- wherein said first and second protuberances are respectively configured to transition longitudinally within said first and second cavities and said projection is configured to transition laterally along said receiving slot in response to lateral variation of said first and second trim members thereby repositioning said third trim member at said center of said first and second trim members.

* * * * *